(12) United States Patent
Fiore (10) Patent No.: US 7,451,789 B2
(45) Date of Patent: Nov. 18, 2008

(54) TANK CAR LOADING CONTROL AND MONITORING SYSTEM AND METHOD

(75) Inventor: Joseph C. Fiore, Naperville, IL (US)

(73) Assignee: Delaware Capital Formation, Inc., Wilmington, DE (US)

( * ) Notice: Subject to any disclaimer, the term of this patent is extended or adjusted under 35 U.S.C. 154(b) by 425 days.

(21) Appl. No.: 11/241,752

(22) Filed: Sep. 30, 2005

(65) Prior Publication Data

US 2007/0074782 A1 Apr. 5, 2007

(51) Int. Cl.
B65B 1/30 (2006.01)
(52) U.S. Cl. .................. 141/198; 141/95; 73/32 R; 702/100; 137/386
(58) Field of Classification Search .............. 141/198, 141/192, 2, 83, 95; 73/32 R, 444, 313; 244/172.2; 702/50, 100; 137/386, 389
See application file for complete search history.

(56) References Cited

U.S. PATENT DOCUMENTS

| | | | |
|---|---|---|---|
| 4,079,627 A | 3/1978 | Gundlach | |
| 4,174,741 A * | 11/1979 | Parsons et al. | 141/2 |
| 4,304,271 A | 12/1981 | Mowatt-Larssen | |
| 4,406,152 A | 9/1983 | Palmer et al. | |
| 4,418,571 A | 12/1983 | Asmundsson et al. | |
| 4,513,795 A * | 4/1985 | Davis et al. | 141/35 |
| 4,551,719 A | 11/1985 | Carlin et al. | |
| 4,782,451 A | 11/1988 | Mazzarella et al. | |
| 4,856,047 A | 8/1989 | Saunders | |
| 4,911,006 A | 3/1990 | Hargarten et al. | |
| 4,915,145 A * | 4/1990 | Schirmacher | 141/95 |
| 5,003,830 A | 4/1991 | Spencer | |
| 5,008,661 A | 4/1991 | Raj | |
| 5,076,100 A * | 12/1991 | Hunter et al. | 73/290 V |
| 5,132,923 A | 7/1992 | Crawford et al. | |
| 5,189,911 A | 3/1993 | Ray et al. | |
| 5,225,813 A | 7/1993 | Raub, Sr. | |
| 5,351,725 A | 10/1994 | Suthergreen et al. | |
| 5,534,856 A | 7/1996 | Cadman | |
| 5,651,286 A | 7/1997 | Champion et al. | |
| 5,659,470 A | 8/1997 | Goska et al. | |
| 5,665,895 A | 9/1997 | Hart et al. | |
| 5,703,569 A | 12/1997 | Oliver et al. | |
| 5,727,608 A | 3/1998 | Nusbaumer et al. | |
| 5,786,998 A | 7/1998 | Neeson et al. | |

(Continued)

Primary Examiner—Timothy L Maust
Assistant Examiner—Jason K Niesz
(74) Attorney, Agent, or Firm—Seyfarth Shaw LLP (57) ABSTRACT

A system and method for automatically maximizing the quantity of a fluid which can be placed within a tank car having a maximum product weight based on the lesser of either an industry maximum product weight limit and a maximum calculated product weight at 2% outage. The system includes a magnetostrictive probe having a movable float and a temperature gauge thereon and mounted within a tank car, such that the float is capable of being buoyed by a fluid. The system further includes a fluid pump capable of activation to transfer fluid from a bulk source to a tank car, and a controller coupled wirelessly to the magnetostrictive probe and an input device, and wired to one of either a fluid pump or shutoff valve, such that the maximum product weight is entered to the controller by the input device and the controller activates the pump or shutoff valve to begin addition of fluid to the tank car.

25 Claims, 6 Drawing Sheets

U.S. PATENT DOCUMENTS

| | | | |
|---|---|---|---|
| 5,868,179 A * | 2/1999 | Hartsell, Jr. | 141/198 |
| 5,913,180 A | 6/1999 | Ryan | |
| 5,966,311 A | 10/1999 | Stemporzewski, Jr. et al. | |
| 6,026,683 A | 2/2000 | Lee | |
| 6,053,041 A | 4/2000 | Sinha | |
| 6,085,805 A | 7/2000 | Bates | |
| 6,125,697 A | 10/2000 | Holton et al. | |
| 6,335,690 B1 | 1/2002 | Konchin et al. | |
| 6,345,214 B1 | 2/2002 | Dulphy-Vigor et al. | |
| 6,401,045 B1 * | 6/2002 | Rogers et al. | 702/51 |
| 6,681,815 B1 * | 1/2004 | Westrich et al. | 141/95 |
| 7,178,561 B2 * | 2/2007 | Memmott et al. | 141/1 |
| 2002/0029633 A1 | 3/2002 | Yekutiely et al. | |
| 2002/0075145 A1 | 6/2002 | Hardman et al. | |
| 2006/0157146 A1 * | 7/2006 | Hillam et al. | 141/198 |

* cited by examiner

TANK CAR LOADING CONTROL AND MONITORING SYSTEM AND METHOD

TECHNICAL FIELD OF THE INVENTION

The present invention relates to a method and system for controlling and/or monitoring the loading of a bulk container, such as a rail tank car, with a fluid material. Specifically, the method and system relate to the controlling and/or monitoring of a loading process to maximize the utilization of the container volume or weight limits.

BACKGROUND OF THE INVENTION

Today, America's fluid transport companies rely on rail tank cars for routine, safe, efficient, cost effective handling of some of the most corrosive and volatile chemicals and gases, such as chlorine or liquefied petroleum gas (LPG), as well as general service products, such as alcohol, polymers, corn syrup and the like. Railroad tank cars have served an important role in the shaping of many industries.

In the late 1800's Standard Oil dominated one such industry by gaining control of oil shipping using railroad tank cars as a "secret weapon." At the time, oil refined into kerosene was in big demand for lighting and other household and business uses. The earliest tank cars were built in 1865 to transport the oil from field wells to the refineries. Although the cars were little more than two large wooden tubs mounted on a flatcar, they were much more efficient than previous shipping options. And within five years, an improved design using the now-familiar cylindrical iron tanks made tank cars the obvious transportation choice.

Nonetheless, tank car design continued to evolve. Shortly after the turn of the century, cars with iron tanks banded onto wooden underframes were replaced by steel "X-car" (named for the shape of its underframe), which connected the tank to an underframe with a specially-created anchor to keep the tank from shifting. The durable X-car permitted new commodities such as gasoline and chemicals to be shipped more safely. Heater pipes, opened tank car shipping to products such as paraffin and asphalt.

During the 1920s, new markets emerged for chemicals, liquefied gas and foods. And the explosion in auto ownership increased the oil industry itself far beyond anything previously experienced. It wasn't long, however, before the collapse of the nation's economy in the Depression of the early 1930s, caused the number of surplus tank cars to increase dramatically. Thousands of tank cars were repurchased from customers by manufacturers who eventually leased them out as business recovered, launching a trend that continues today.

Innovations in a new fusion welding process led to increased tank strength, and as a result various products were able to be shipped under high pressure. When World War II broke out, the threat of enemy submarines kept oil tankers off the seas, and tank cars became crucial to the wartime effort. Nearly 15,000 retired tank cars were sent to repair shops, where they were refurbished to haul oil in government-run unit trains.

When the war ended, the tank cars' dominant role in transporting bulk liquids was increasingly threatened by the growth of both oil pipelines and long-haul trucking. In response to this competitive threat, an all-out effort to serve producers in emerging markets such as petrochemicals and fertilizers was launched.

In 1954 a revolutionary new domeless tank car without an underframe was unveiled. An underframeless car had been designed back in the early 1900s, but it was rejected then as unsafe. However, engineers now felt that the tank arrangement actually improved the overall strength of the car. They also proved that the top dome, long considered necessary to hold product expansion during shipping, could be eliminated simply by filling the tank slightly less than full.

Government and industry standards soon set tank car load limits based on one of either a 2% outage point—a percentage of the tank car's volume required to remain empty—or the maximum gross weight of the tank car, including contents. For companies filing tank cars, and paying based on the number of tank cars used, filling each car as full as allowable is imperative to cost effectiveness. However, until the present invention, it was difficult to accurately estimate the full level point of a tank car due to factors such as temperature fluctuations, varied tank car configurations, changing flow rates, and the like.

Thus, there is a need, generally, for a system which assists in controlling and monitoring tank car loading while achieving maximum usage of tank volume or weight limits. Specifically, a need exists for a system which provides monitoring and control of the filling process automatically and, in some cases, remotely.

SUMMARY OF THE INVENTION

There is disclosed herein an improved system and method for controlling and/or monitoring the filling of a tank car while affording additional structural and operating advantages.

It is, therefore, an aspect of the present invention to provide a method for automatically maximizing the quantity of a fluid which can be placed within a tank car. In one embodiment, the method includes the steps of placing a magnetostrictive probe having a movable float thereon within a tank car to be filled with a fluid, wherein the float is buoyed by the fluid, determining an actual maximum product weight of the fluid for the tank car using the lesser of either the maximum product weight limit and the maximum calculated product weight at 2% outage, and then activating a pump, through hard wiring or wirelessly, to begin addition of fluid to the tank car. As the fluid is added, the method requires periodically calculating an outage value of the tank car based on the float line of the float in the fluid, wirelessly directing the outage value to a controller, and then calculating a float line correction for the given fluid at a determined temperature. Once this calculation is complete, the method then proceeds by wirelessly directing the float line correction to the controller, and adjusting, via the controller, the outage value of the tank car based on the float line correction. These steps to calculate a float line correction and adjusting the outage value may be repeated for temperature changes of at least 10 degrees F. of the fluid.

To complete the disclosed method requires calculating the full point tank volume prior to complete filling of the tank car based upon the formula:

$$\frac{\text{determined actual maximum product weight}}{(\text{specific gravity of fluid at fluid temp} \times 8.33 \text{ lbs/gallons})},$$

then wirelessly directing the calculated full point tank volume to the controller, determining, via the controller, a level point (outage) corresponding to full point tank volume calculated, and finally deactivating the pump to cease addition of fluid to the tank car when the calculated outage value equals the level point (outage).

Alternatively, the method can be directed only to the monitoring of the filling process. Accordingly, it is an aspect of the claimed invention to provide a method for automatically monitoring the fluid level within a tank car during filling, including the steps of placing a magnetostrictive probe having a movable float thereon within the tank car to be filled with a fluid, wherein the float is capable of being buoyed by the fluid, calculating an outage value of the tank car based on a float line of the float in the fluid, wirelessly directing the calculated outage value to a controller, calculating a float line correction for a given fluid at a determined temperature, wirelessly directing the float line correction to the controller, and then adjusting the outage value of the tank car based on the float line correction.

It is another aspect of the claimed invention to provide a method for automatically correcting the quantity of fluid measured within a tank car during filling. The disclosed method includes the steps of activating a pump to begin addition of a given fluid to a tank car, calculating an outage value of the tank car based on a float line of a float in the fluid and specific gravity of the fluid, and wirelessly directing the calculated outage value to a remote device (e.g., a controller). Further, the method requires measuring a temperature of the given fluid, calculating a float line correction for the given fluid based on the determined temperature, and then wirelessly directing the float line correction to the controller. Finally, the method then requires adjusting, via the controller, the calculated outage value of the tank car based on the float line correction.

Finally, as one embodiment for achieving objects of disclosed methods, it is an aspect of the invention to provide a system for automatically maximizing the quantity of a fluid which can be placed within a tank car having a maximum product weight based on the lesser of either an industry maximum product weight limit and a maximum calculated product weight at 2% outage. The system includes a magnetostrictive probe having a movable float and a temperature gauge thereon and mounted within a tank car, wherein the float is capable of being buoyed by a fluid, a fluid pump capable of activation to transfer fluid from a bulk source to a tank car, a controller coupled wirelessly to the magnetostrictive probe and an input device, and wired to one of either a fluid pump or shutoff valve, wherein the maximum product weight is entered to the controller by the input device and the controller activates the pump or shutoff valve to begin addition of fluid to the tank car, and a system monitor coupled to the controller and wirelessly coupled to the magnetostrictive probe.

The system monitor obtains an outage value of the tank car based on a float line of the float in the fluid and the temperature of the fluid and the monitor calculates a float line correction for the given fluid at the determined temperature and then calculates a full point tank volume prior to complete filling of the tank car based upon the formula:

$$\frac{\text{determined actual maximum product weight}}{(\text{specific gravity of fluid at fluid temp} \times 8.33 \text{ lbs/gallons})},$$

wherein the calculated full point tank volume is directed to the controller and a level point (outage) corresponding to the full point tank volume is calculated by the controller which then deactivates the pump or shutoff valve when the calculated outage value equals the level point (outage).

These and other aspects of the invention can be more readily understood when considered in the conjunction with the following description of the invention and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENT(S)

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring generally to FIGS. 1-6, there are illustrated embodiments of a system and method for controlling and/or monitoring the filling of a tank car with a fluid. For purposes of the following discussion, the control and monitoring system, in its various embodiments, will be generally referenced throughout this application and in the appended drawings by the number "10." Components of the system will likewise be consistently numbered in the various embodiments to assist in the understanding of the disclosed invention.

The system, for use with a tank car 12, is generally comprised of a gauging device 14, which includes a scaled guide tube 16, a float 18, and a probe 20, a transponder 22 affixable to the probe 20, and a remote device 24, such as a controller 26 and/or a personal digital assistant (PDA) 28. Each of these components is explained in greater detail with respect to various embodiments of the present invention.

Additionally, the following terms, phrases, and abbreviations are used throughout the present application and should be understood to have the following definitions for purposes of discussing the claimed invention:

Tank Car I.D. No.—Refers to the tank car identification number typically stenciled on the side of a tank car. It will be stored in the probe flash RAM.

Max. Gross Wgt.—Refers to the maximum gross weight typically stenciled on the side of the tank car. It is the maximum allowable weight of the tank car (with contents), usually 263,000 lbs. This is one of the loading limits which will be used to determine the amount of product which can be loaded into the tank car. It will be stored in the probe flash RAM.

Tank Car Lt. Wgt.—Refers to the tank car weight stenciled on the side of the car. It is the weight of the tank car without product. This parameter will be used to determine the amount of product which can be loaded into the car. It will be stored in the probe flash RAM.

Tank Car Loading Limit—Refers the tank car loading limit determined by the lesser of either the 2% outage level point or the total product weight limit (i.e., Max. Gross Wgt.—Tank Car Lt. Wgt.).

Gage Ref. No.—Refers to the gauging (strapping) table for the tank car. There will be one gauging table per production series of cars. This is a table which shows volume vs. inches of fluid in the tank. This table is used to convert level, measured by the probe, to volume. This table will be stored in the probe flash RAM.

Min. Outage %—Refers to the minimum required outage (empty space) of the tank car. AAR requires that tank cars have 2% of the car's total volume remain empty to allow for thermal expansion of the product. This value will be set in software at 2%.

Product Temp.—Refers to the temperature of the product coming from a processing plant before filling. The temperature will be entered by an operator.

Level (outage)—Refers to the fluid level, in outage (empty space remaining in tank), reported by the probe.

Specific Gravity—Refers to the specific gravity of a product being loaded into a tank car at a given temperature.

Float Line Correction—Refers to the float line level automatically corrected for changes in specific gravity (which changes with temperature) of the product.

Actual (Calculated) Gross Wgt.—Refers to a "real time" gross weight on the tank car. This value is calculated based on the tank car light weight, the gage reference table, specific gravity of the product and the liquid level reported from the probe.

Calculated Full Point—Refers to the full level, in outage, at which the loading must be stopped, theoretically. This value is calculated from the tank car light weight, the gage reference table, specific gravity of the product and the lesser of the maximum gross weight of the 2% outage point.

Actual Full Point—Refers to the same thing as the "Calculated Full Point" except it is corrected by the operator. The operator will modify the "Calculated Full Point" to account for discrepancies in the actual light weight of the car vs. the "as-built" value, discrepancies between scales at the loading vs. rail exchange facilities and other operational discrepancies. This is the final full point used to stop the tank car loading process.

Figure 1:
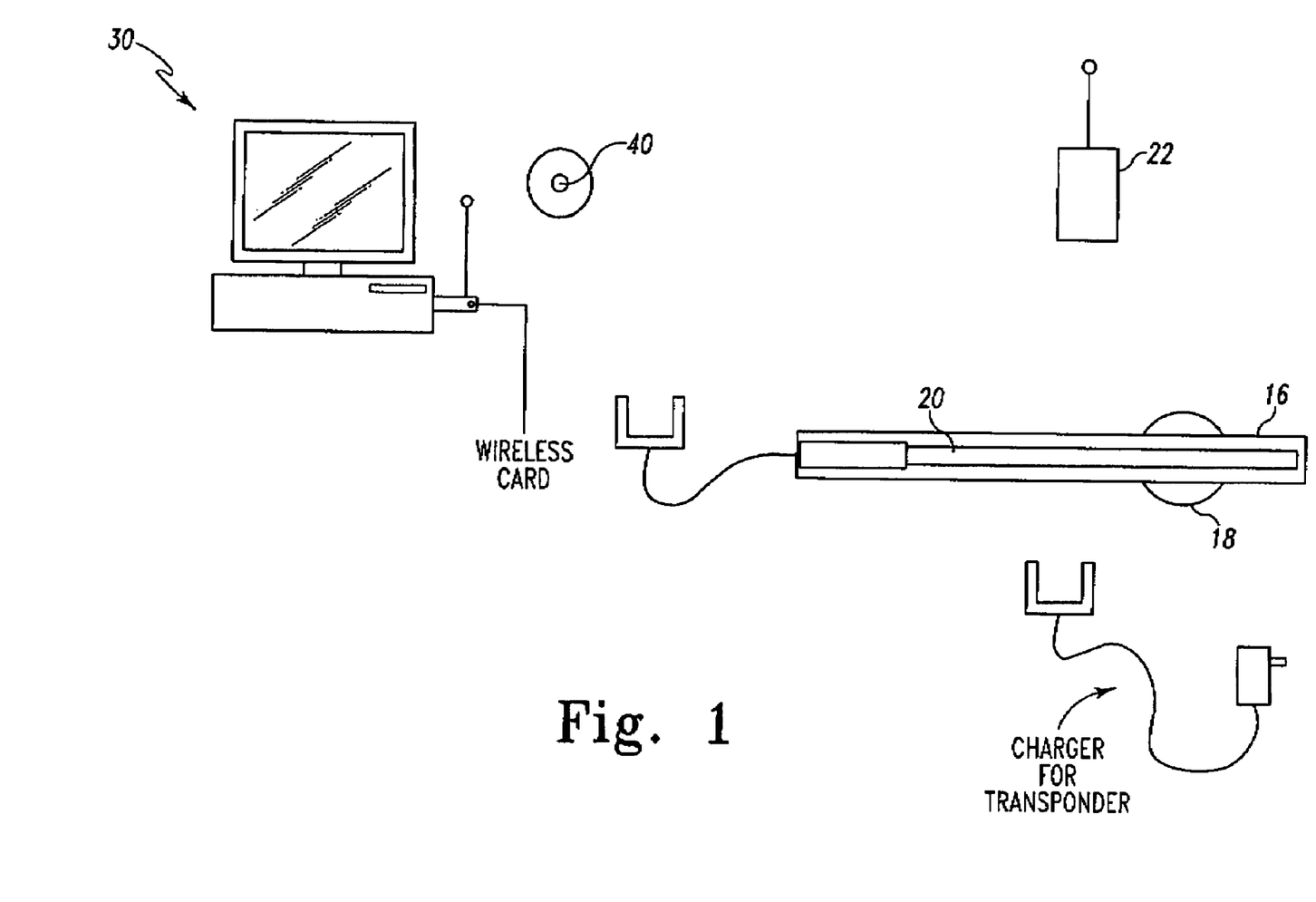
FIG. 1 is a schematic of an embodiment of the present invention illustrating the programming of the gauging device.

Referring now to FIG. 1, the initial programming system of the invention can be more readily understood. Software 40 by Grayhill of LaGrange, Ill., can be loaded into a computer system 30 which allows tank car builders to program an E-PROM, or other suitable programmable chip, within each individual gauging device 14, preferably within the resident probe 20, by downloading a gauge (strapping) table, tank car identification number, and the tank car lightweight, weight limits, etc. Because the gauging device 14 containing the probe 20 travels with the tank car, it is possible for the controller 26 to monitor and control level and volume of the tank car in real time. Additionally, the programmable memory can be used to store the "last product loaded." This feature may be useful for subsequent loaders of the tank car 12, so they are made aware of what material was held in the tank car 12 previously. The probe 20 can either be wired for download or the download can be done wirelessly. Further, the programming allows the builder to download a nozzle height which is used as an automatic offset so the probe 20 is zeroed at the shell full point.

Figure 2:
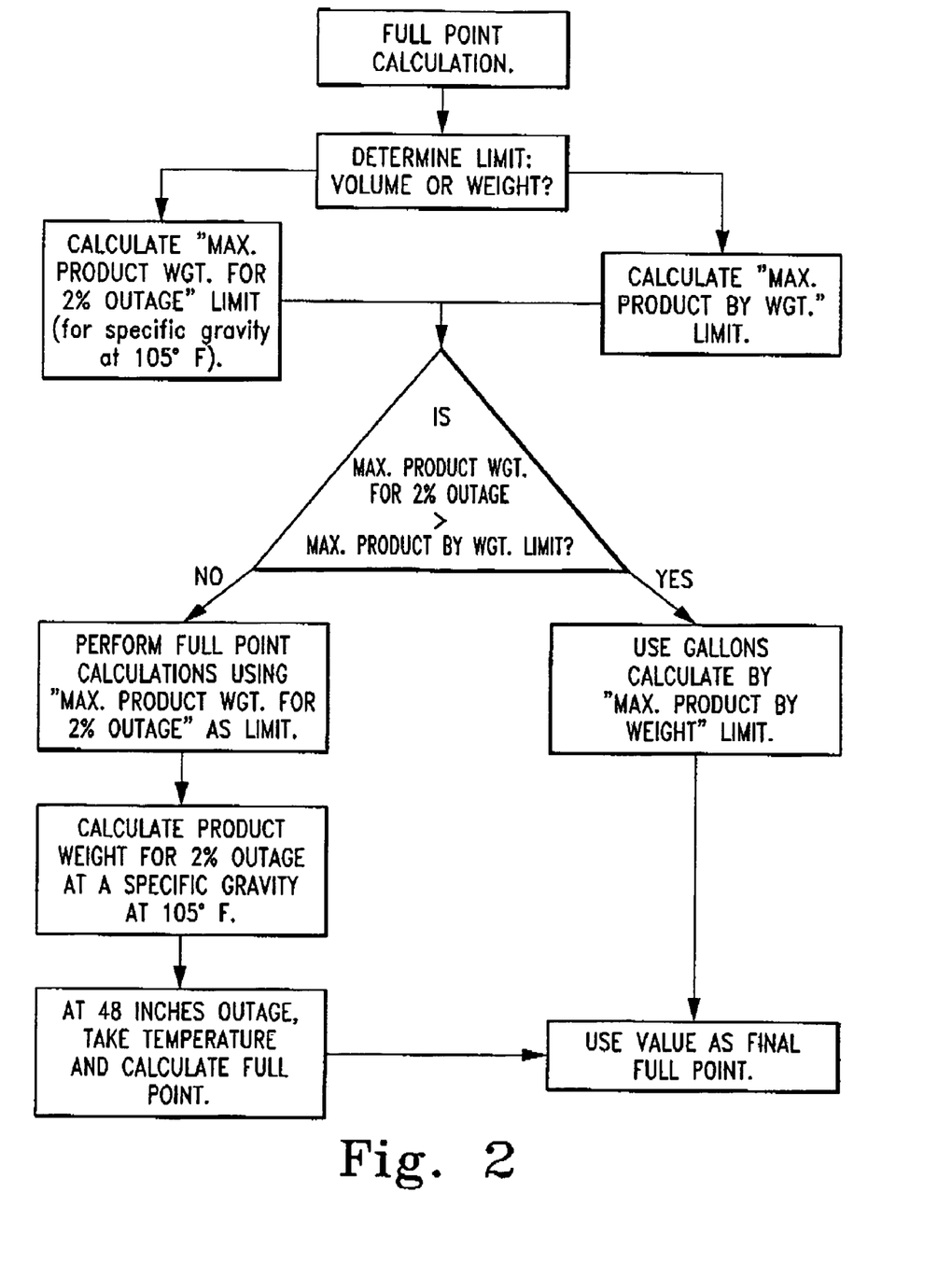
FIG. 2 is a flow chart of an embodiment of the present invention showing, generally, the method for determining a full point.
Figure 3:
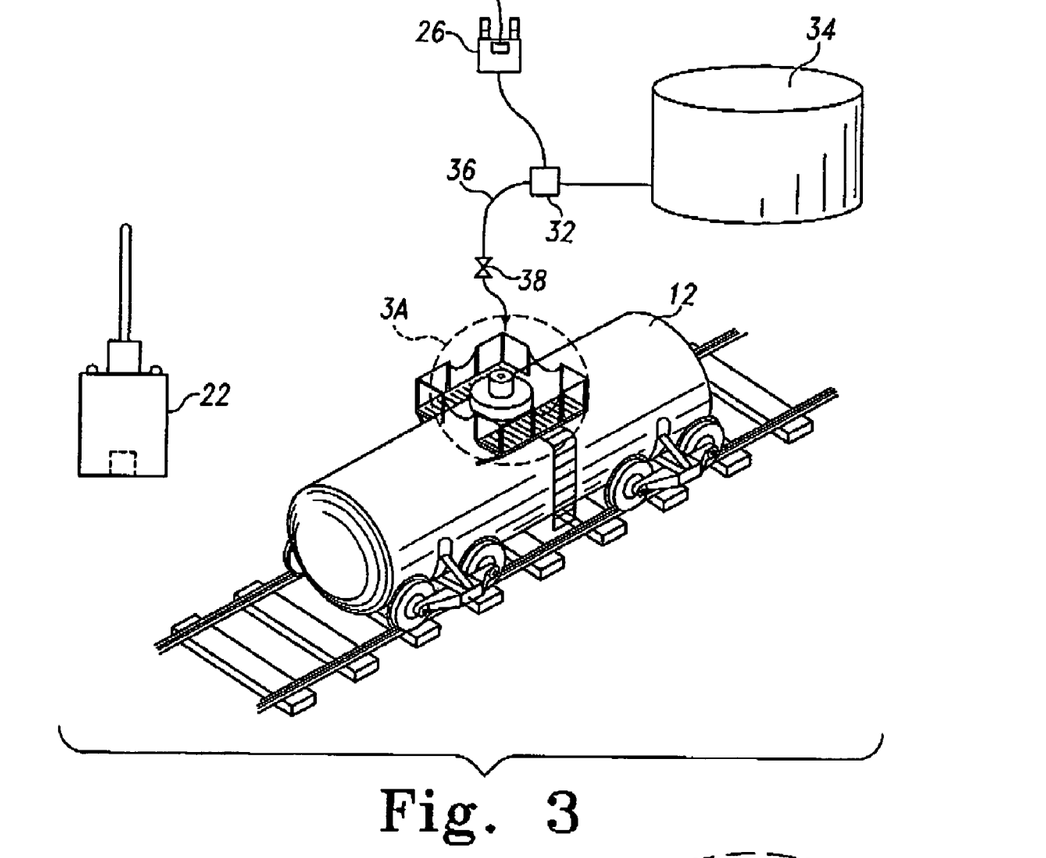
FIG. 3 is a schematic view of an embodiment of the present invention illustrating a rail tank car and system components.
Figure 3A:
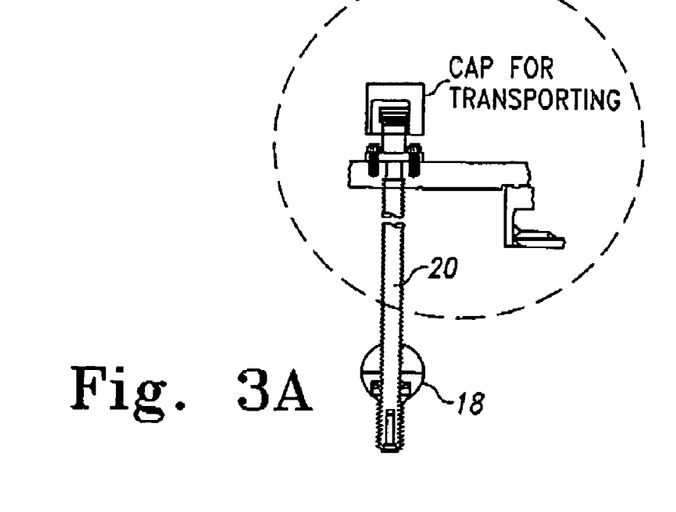
FIG. 3A is a partial cross-sectional view of the circled area highlighted in FIG. 3.
Figure 4:
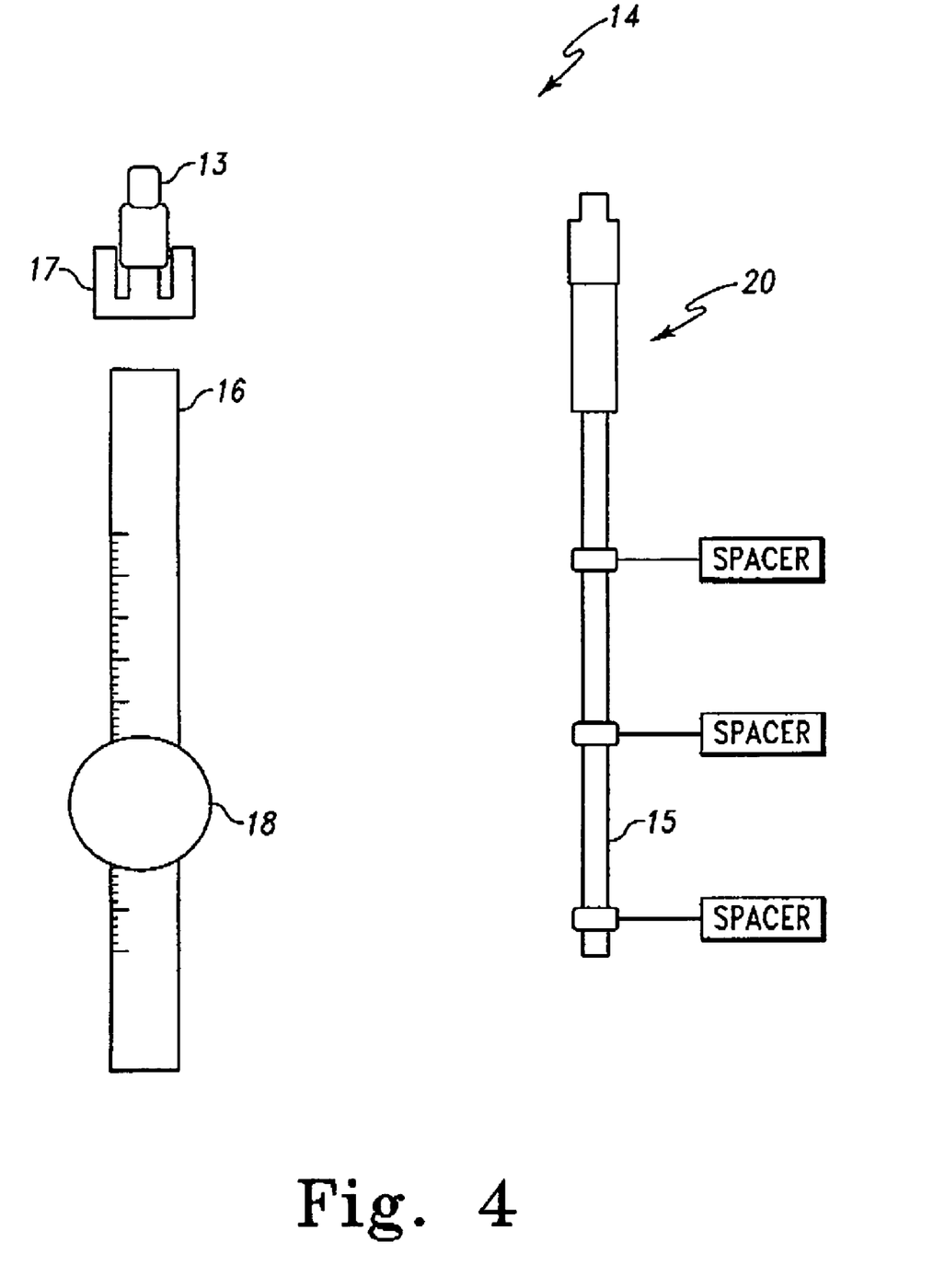
FIG. 4 is a schematic view of an embodiment of the gauging device of the present invention.

FIGS. 2-4 represent one embodiment of the present control and monitoring system 10. The system 10, in one embodiment, may be utilized to automatically maximize the quantity of a fluid which can be placed within a tank car 12 having a maximum product weight. The maximum product weight is based on the lesser of either an industry maximum product weight limit and a maximum calculated product weight at 2% outage, which is actually based on a maximum volume of the tank car.

The industry maximum product weight limit can be determined from the Max. Gross Wgt. of the tank car and the Tank Car Lt. Wgt., both of which are typically stenciled on the tank car and would be loaded into the probe 20 according to the programming system of the invention illustrated in FIG. 1. Subtracting the Tank Car Lt. Wgt. from the Max. Gross Wgt. yields the maximum product weight limit. In the U.S., the Max. Gross Wgt. of a tank car is set at 263,000 lbs, with some exceptions (Note: this limit is 286,000 lbs in Canada). Therefore, for example, if the Tank Car Lt. Wgt. is 165,000 lbs, then the maximum product weight would be 98,000 lbs (i.e., 263,000-165,000=98,000).

The maximum calculated product weight at 2% outage is slightly more complicated to compute. A 2% outage volume is equivalent to 98% of the tank car full volume. This can be found by taking 98% of the largest volume (in gallons) shown on the gauging (strapping) table for the particular tank car. The resulting volume (in gallons) is then multiplied by the specific gravity of the fluid at 105° F., which is then multiplied by the density of water (i.e., 8.33 lbs/gal.). This yields a weight of the maximum volume at 2% outage.

As shown in the flow chart of FIG. 2, the lesser of these two weight calculated values is deemed the maximum product weight limit and is then used to calculate the tank car 12 full point, in gallons. To derive the full point based on the maximum product weight limit, the temperature of the fluid to be filled must be determined. A specific gravity lookup table is then used to find the specific gravity of the fluid at the measured temperature. The maximum product weight limit is then divided by the specific gravity multiplied by the density of water (i.e., 8.33 lbs/gal) to yield a corresponding volume, in gallons.

The gauge (strapping) table is consulted at this point to find a volume to match as closely as possible the corresponding volume (corresponding volume≦gauge table volume). With the gauging table volume found, a corresponding level, preferably in inches, can be determined. The level is the target outage (i.e., empty space) for the tank car 12 measured from the top of the inside shell.

Referring to FIG. 4, in order to make the necessary measurements and calculations, the system 10 includes a gauging device 14, manufactured and sold by Midland Manufacturing Corp. of Skokie, Ill. The gauging device 14 includes a magnetostrictive probe 20 (manufactured by OPW Fuel Management Systems, Chicago, Ill.), having a movable float 18 and a temperature gauge 15 thereon and is positioned within a guide tube 16, the entire gauging device 14 being preferably mounted within the tank car 12. A holder or mount 17 for the transponder couples to the top of the probe 20, and utilizes a cap 13 for protection during transport. Cap 13 also provides a secondary pressure seal in the event of a leak in the gauging device guide tube 16.

The magnetostrictive probe 20 is preferably comprised of a stainless steel body and aluminum head, may utilize most any conventional float size (i.e., 2 inch and 4 inch sizes), and is preferably capable of measuring most product level changes, such as gasoline, diesel and other approved fluids, to a resolution of 0.0005" (0.0127 mm) or water level changes to a resolution of 0.01" (0.254 mm). The probe 20 should preferably support extended operation within a temperature range of from about −40° F. to about 140° F. (about −40° C. to 60° C.). The float 18 in the guide tube 16 is capable of being buoyed by the fluid to be added to the tank car 12. The gauging devices 14 can be both retrofitted to existing tank cars and supplied as an OEM part for new tank cars.

Figure 6:
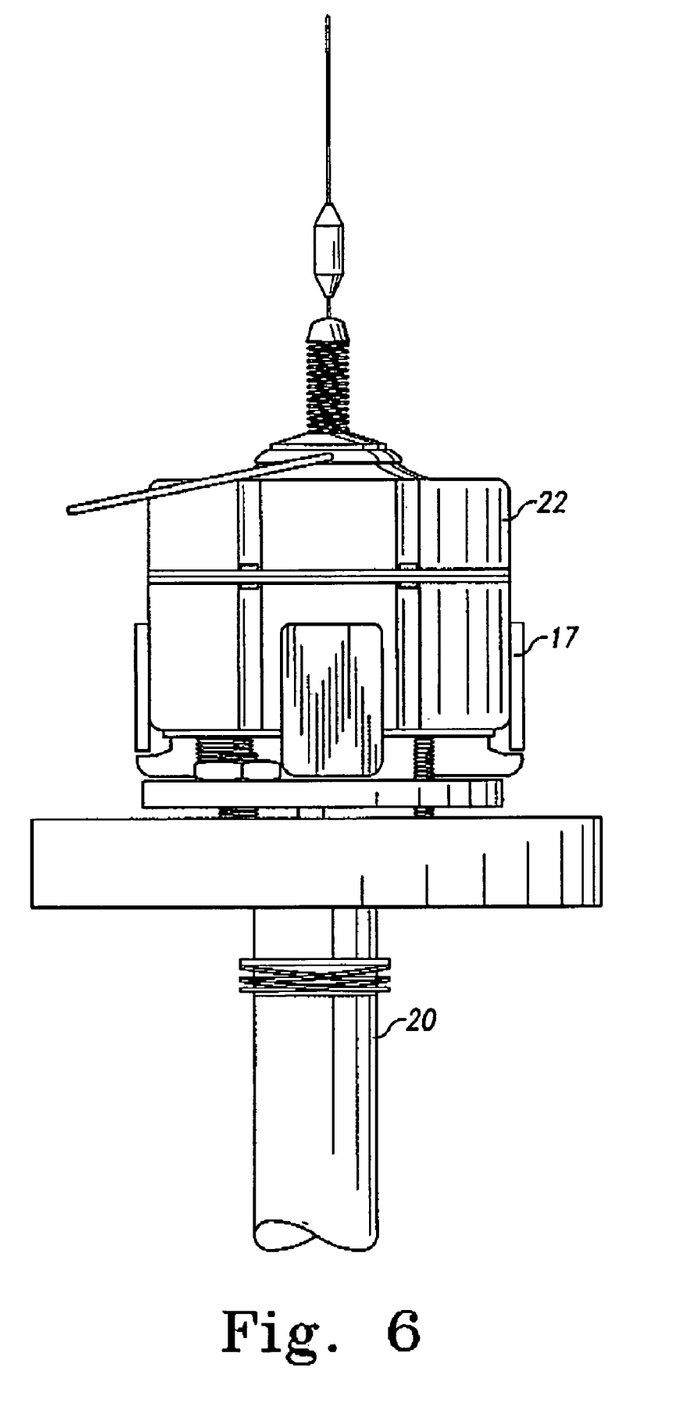
FIG. 6 is a elevated side view showing a transponder coupled to a tank car probe.

A fluid pump 32 capable of activation is used to transfer fluid from a bulk source 34 through a supply line 36 to the tank car 12, via a nozzle (not shown). Alternatively, an electronic control valve 38 may be used such that activation (i.e., opening of the valve) permits flow of fluid through the supply line 36 to the tank car 12. In the present embodiment, a controller 26 (manufactured by Civacon, Kansas City, Mo.) is coupled wirelessly to the magnetostrictive probe 20 through a wireless transponder 22 connected to the probe 20, as shown in FIG. 6. The controller 26 is also electronically connected to the fluid pump 32 and/or control valve 38.

Figure 5:
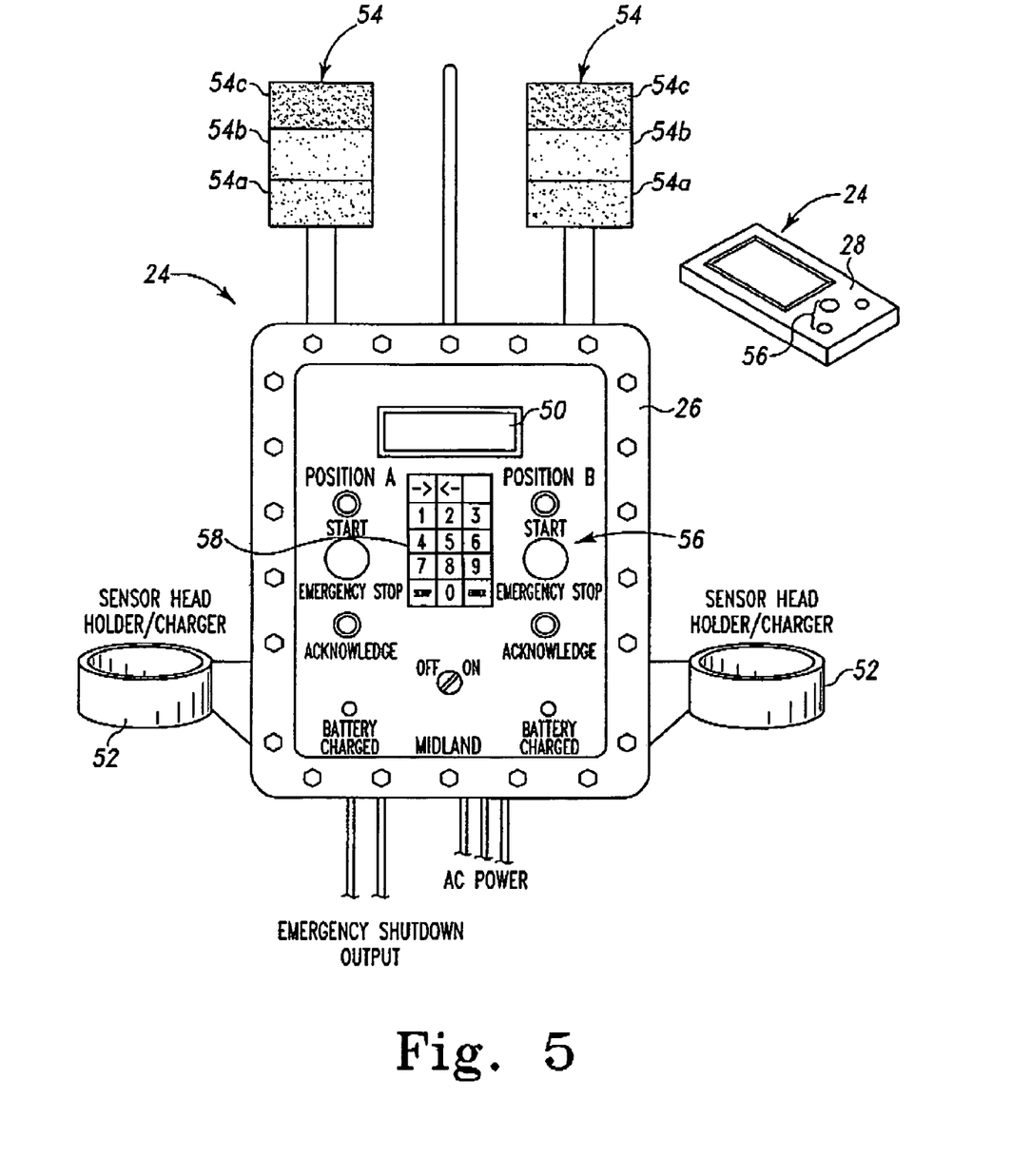
FIG. 5 is a schematic view of an embodiment of the present invention illustrating the monitoring and control components of the system.

The controller 26 is preferably explosion proof and an intrinsically safe system approved for use in Class 1, Division 1, Groups C&D hazardous areas (e.g., LPG). The controller 26 provides pump or valve shutoff upon reaching the maximum product limit, and can simultaneously display system parameters, such as level, volume or weight, on panel 50. Suitable memory is preferably provided to allow storage of the necessary specific gravity lookup tables (or formulas) vs. various temperatures. This allows the controller 26 to make the necessary corrections to the float line as discussed below. The controller 26 may also comprise charging ports 52 for transponders 22, which are equipped with limited, but rechargeable internal power sources.

In the illustrated embodiment, the controller 26 is capable of monitoring and controlling two parallel loading positions simultaneously. A single site controller (not shown) is also possible for many applications. Indicator lights 54 give a visual cue of the system status where the lower (green) light 54a indicates "System Ready," the middle (yellow) light 54b indicates "High Level" (i.e., approximately a 5% outage point), and the upper (red) light 54c indicates "Shutdown" (i.e., 2% outage full point achieved). Other visual and audible cues may be incorporated as desired.

An input device 56, such as, for example, keypad 58 on controller 26 or PDA 28, is also electronically coupled to, and may be integral to the controller 26 or PDA 28 to allow the maximum product weight to be entered to the controller 26. Alternatively, the maximum product weight may be computed by the controller 26 based on data fed to the controller from the transponder 22. As stated previously, the probe 20 is preferably equipped with an E-PROM or PROM having the necessary tank car strapping table stored from the programming system. This data can be transmitted to the controller 26 and/or PDA 28 by the transponder for the necessary computations. The controller 26 can then activate and deactivate the pump 32 or control valve 38 in real time to commence or terminate, respectively, addition of fluid to the tank car 12.

As an alternative to monitoring and controlling the fluid transfer to a rail tank car 12, a system monitor, for example, a PDA (personal digital assistant) 28 such as the one manufactured by ECOM Instruments of Houston, Tex., may be used to only monitor in real time the system 10 parameters of the fluid transfer. The control of the transfer (i.e., starting and stopping) may be performed manually or through other automated control features known to those skilled in the art. The PDA may also be coupled to the controller 26 and wirelessly coupled to the magnetostrictive probe 20 in the same way the controller 26 is wirelessly coupled to the probe 20—i.e., through the wireless transponder 22. The rechargeable wireless transponder 22, made by Gray Hill, LaGrange, Ill., preferably coupled to the probe 20, is used to transmit data to the controller 26, the PDA 28, or both. In the manner described previously, the system monitor obtains an outage value of the tank car 12 based on a float line of the float 18 in the fluid and the temperature of the fluid as measured by the probe 20. The monitor can then calculate a float line correction for the given fluid at the determined temperature and then calculate a full point tank volume prior to complete filling of the tank car based upon the formula:

$$\frac{\text{determined actual maximum product weight}}{(\text{specific gravity of fluid at fluid temp} \times 8.33\ \text{lbs/gallons})}$$

For the automated control system, the calculated full point tank volume is directed to the controller 26 and a level point (outage) corresponding to the full point tank volume is either calculated, preferably by the controller 26, or found on a lookup table, which may be electronically stored in suitable memory. When the level point is achieved, the controller 26 deactivates the pump 32 or closes the control valve 38.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on preceding description and any prior art.

What is claimed is:

1. A method for automatically maximizing the quantity of a fluid which can be placed within a tank car comprising the steps of:
    placing a probe having a movable float thereon within a tank car to be filled with a fluid, wherein the float is buoyed by the fluid;
    determining a maximum product weight of the fluid for the tank car using the lesser of either the maximum weight limit of the tank car and the maximum calculated product weight at 2% outage;
    wirelessly activating one of either a pump or a control valve to begin addition of fluid to the tank car;
    calculating an outage value of the tank car based on a float line created by the float in the fluid;
    wirelessly directing the outage value to a controller;
    calculating a float line correction for a given fluid at a determined temperature;
    wirelessly directing the float line correction to the controller;
    adjusting, via the controller, the outage value of the tank car based on the float line correction;
    repeating the steps of calculating a float line correction through adjusting the outage value for fluid temperature changes of at least 10 degrees F. during addition of fluid to the tank car;
    calculating the full point tank volume prior to complete filling of the tank car based upon the formula:

determined actual maximum product weight/(specific gravity of fluid at fluid temp×8.33 lbs/gallons);

wirelessly directing the calculated full point tank volume to the controller;

determining, via the controller, a level point corresponding to the full point tank volume calculated; then deactivating either one of a pump or a control valve to cease addition of fluid to the tank car when the fluid reaches the level point.

2. The method of claim 1, wherein the step of deactivating either one of a pump or a control valve is performed wirelessly.

3. The method of claim 1, wherein the step of calculating an outage value is done continuously.

4. The method of claim 3, further comprising the step of performing the method in real time.

5. The method of claim 4, wherein the probe comprises memory and the step of performing in real time comprises the step of storing a gauging table for the tank car in the memory of the probe.

6. The method of claim 1, further comprising the step of wirelessly monitoring the fluid addition, including calculated values and fluid temperature.

7. The method of claim 1, wherein the step of calculating a float line correction is performed in real time.

8. The method of claim 7, wherein the probe comprises memory and the step of calculating a float line correction in real time comprises the step of storing a gauging table for the tank car in the memory of the probe.

9. The method of claim 1, wherein the step of adjusting, via the controller, the outage value is performed in real time.

10. The method of claim 9, wherein the probe comprises memory and the step of adjusting the outage value in real time comprises the step of storing a gauging table for the tank car in the memory of the probe.

11. The method of claim 10, wherein the controller is capable of controlling operations for at least two tank cars simultaneously.

12. The method of claim 1, wherein the step of determining a maximum product weight comprises using a wireless transponder coupled to the probe.

13. The method of claim 1, wherein the step of wirelessly directing the outage value to a controller comprises using a wireless transponder coupled to the probe.

14. The method of claim 1, further comprising activating visual cues to correspond to changing system status.

15. The method of claim 14, wherein the visual cues include a visual cue corresponding to a point less than the full point tank volume.

16. The method of claim 15, wherein the corresponding point is in the range of from about 10% outage to about 3% outage.

17. A method for automatically correcting the quantity of fluid measured within a tank car during filling comprising the steps of:

activating one of either a fluid pump or a control valve to begin addition of a given fluid to a tank car;

calculating an outage value of the tank car based on a float line of a float in the fluid;

wirelessly directing the calculated outage value to a remote device;

measuring a temperature of the given fluid;

calculating a float line correction for the given fluid based on the determined temperature;

wirelessly directing the float line correction to the remote device;

periodically repeating the step of determining a temperature of the given fluid to monitor for changes in fluid temperature; and repeating the steps of calculating a float line correction through adjusting the outage value when the determined temperature of the fluid changes at least 10 degrees F.

18. The method of claim 17, wherein the method is performed in real time.

19. The method of claim 17, wherein the step of calculating a float line correction is performed in real time.

20. The method of claim 17, further comprising the step of calculating the full point tank volume prior to complete filling of the tank car based upon the formula:

$$\frac{\text{determined actual maximum product weight}}{(\text{specific gravity of fluid at fluid temp} \times 8.33 \text{ lbs/gallons})}.$$

21. The method of claim 20, further comprising the step of determining a level point corresponding to the full point tank volume calculated.

22. The method of claim 21, further comprising the step of deactivating either one of a pump or a control valve to cease addition of fluid to the tank car when the fluid reaches the level point.

23. The method of claim 22, wherein the method is performed in real time.

24. The method of claim 17, wherein the step of wirelessly directing the calculated outage value to a remote device comprises using a wireless transponder coupled to a probe.

25. The method of claim 17, wherein the step of wirelessly directing the float line correction to the remote device comprises using a wireless transponder coupled to a probe.

* * * * *